United States Patent [19]

Cornelison et al.

[11] Patent Number: 4,711,009

[45] Date of Patent: Dec. 8, 1987

[54] PROCESS FOR MAKING METAL SUBSTRATE CATALYTIC CONVERTER CORES

[75] Inventors: Richard C. Cornelison, Hiram, Ohio; William B. Retallick, West Chester, Pa.

[73] Assignee: W. R. Grace & Co., New York, N.Y.

[21] Appl. No.: 830,698

[22] Filed: Feb. 18, 1986

[51] Int. Cl.$^4$ ............................................. B21D 53/00
[52] U.S. Cl. ................................. 29/157 R; 29/121.1; 29/527.4; 29/DIG. 32; 29/DIG. 39; 72/196; 422/180
[58] Field of Search .................. 29/157 R, 6.1, 6.2, 29/163.5 F, 527.2, 527.4, 121.1, DIG. 32; 72/196; 422/177, 178, 179, 180, 181

[56] References Cited

U.S. PATENT DOCUMENTS

| | | |
|---|---|---|
| 1,749,342 | 3/1930 | Hazen . |
| 2,501,836 | 3/1950 | Barber . |
| 2,820,630 | 1/1958 | Schwartz et al. . |
| 2,873,965 | 2/1959 | Mitchell . |
| 3,318,128 | 5/1967 | Rhodes . |
| 3,328,025 | 6/1967 | Gales . |
| 3,489,406 | 1/1970 | Nystrand . |
| 3,917,250 | 11/1975 | Branick . |
| 3,920,173 | 11/1975 | Salata . |
| 3,942,300 | 3/1976 | White . |
| 3,966,646 | 6/1976 | Noakes et al. . |
| 4,012,932 | 3/1977 | Gewiss . |
| 4,059,000 | 11/1977 | Bodnar ............................ 72/196 X |
| 4,061,325 | 12/1977 | Marcalus et al. . |
| 4,098,722 | 7/1978 | Cairns et al. .................. 29/157 R X |
| 4,153,663 | 5/1979 | Vetter et al. . |
| 4,243,495 | 1/1981 | Trott . |
| 4,382,323 | 5/1983 | Chapman et al. ................ 29/157 R |
| 4,521,947 | 6/1985 | Nonnenmann et al. .......... 29/157 R |
| 4,567,630 | 2/1986 | Ishida et al. .................. 29/157 R X |
| 4,627,258 | 12/1986 | Loges ..................................... 72/196 |

Primary Examiner—Howard N. Goldberg
Assistant Examiner—Ronald S. Wallace
Attorney, Agent, or Firm—Robert A. Sturges; Steven T. Trinker

[57] ABSTRACT

There is provided a process and apparatus for making, preferably continuously, a catalytic converter element or core especially adapted for the treatment of exhaust from an internal combustion engine, whether spark or compression ignited. The converter element may be a fan-folded or accordion folded thin metal strip or a spirally wound element which carries strongly adhered to the surface thereof a catalyst, e.g. a noble or precious metal catalyst such as platinum and/or palladium and/or rhodium. The metal strip entering the process is an aluminum coated ferritic ribbon between 0.001 and 0.003 inches thick, and 1 inch to 30 inches wide. The strip is preferably annealed and perforated at predetermined intervals. Thereafter, the strip is corrugated and given a washcoat of a refractory metal oxide which is calcined onto the surface. One or more precious metal catalysts are supplied and dried. The strip is desirably, albeit optionally, creased in a manner to enable it to be folded back and forth upon itself, severed to size, and folded to build a catalytic converter element. Final steps may include insertion of the catalytic converter element into a housing and affixing end caps to form a complete unit. This process provides a continuous low cost means for making catalytic converters.

37 Claims, 12 Drawing Figures

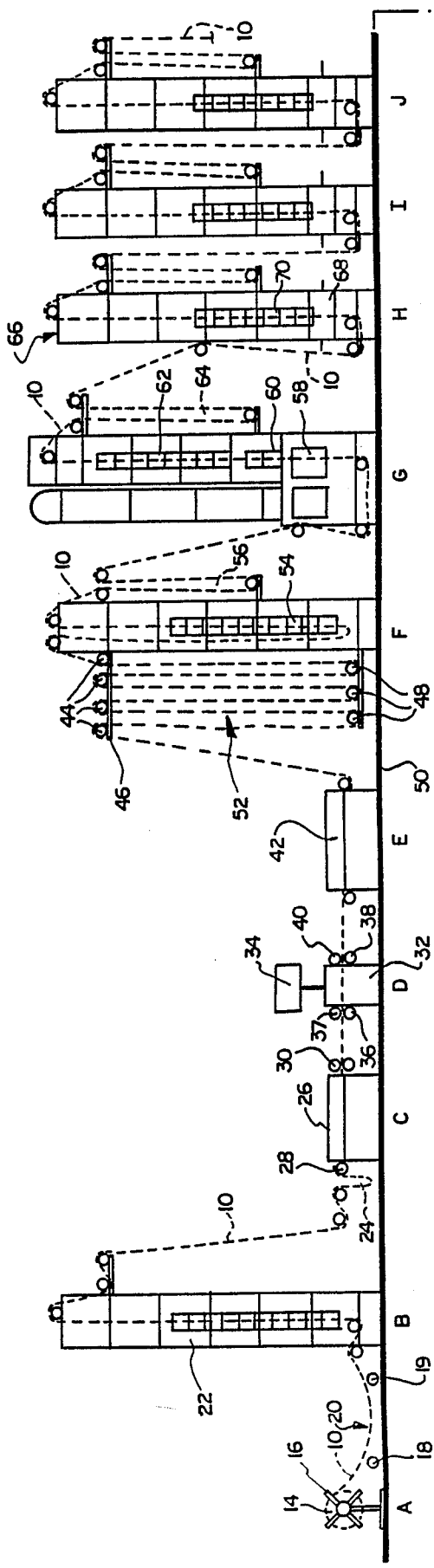
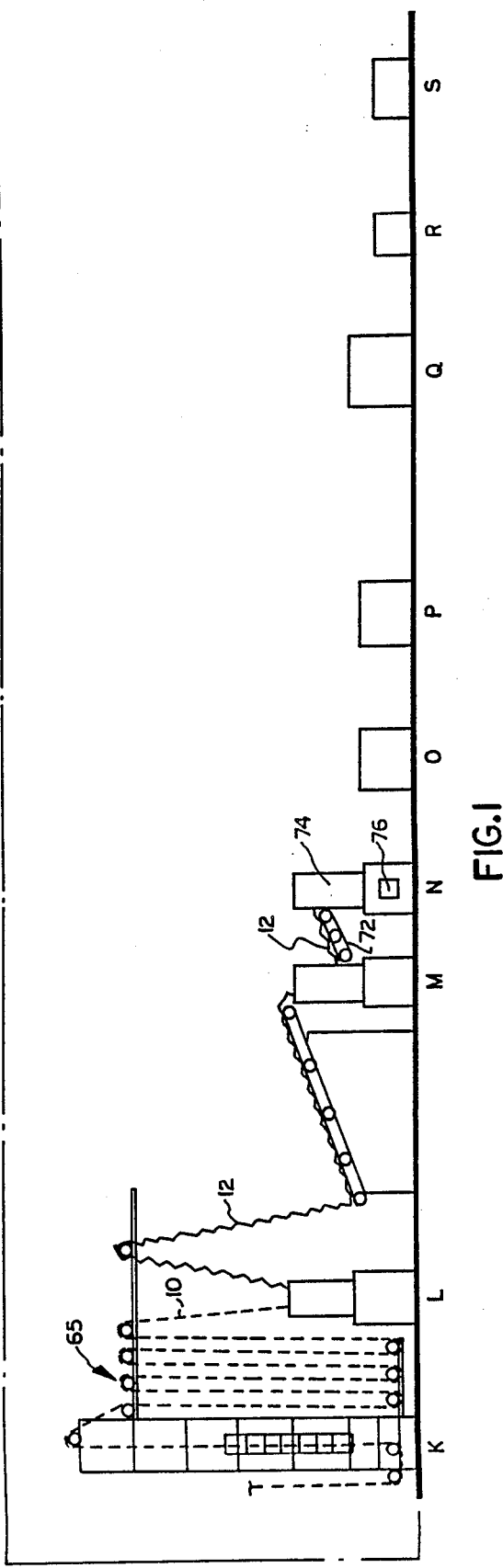
FIG.1

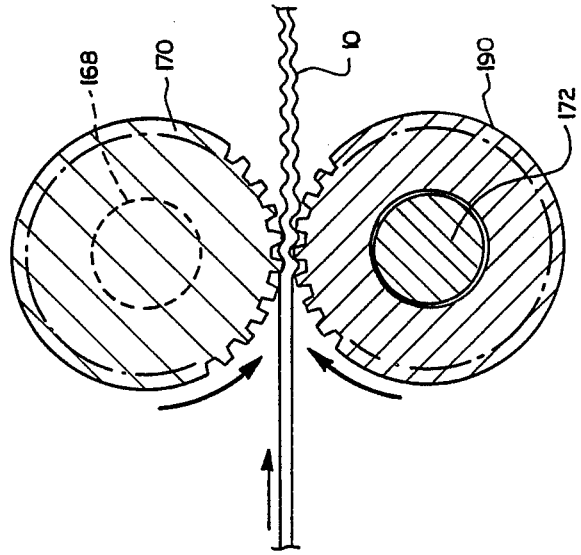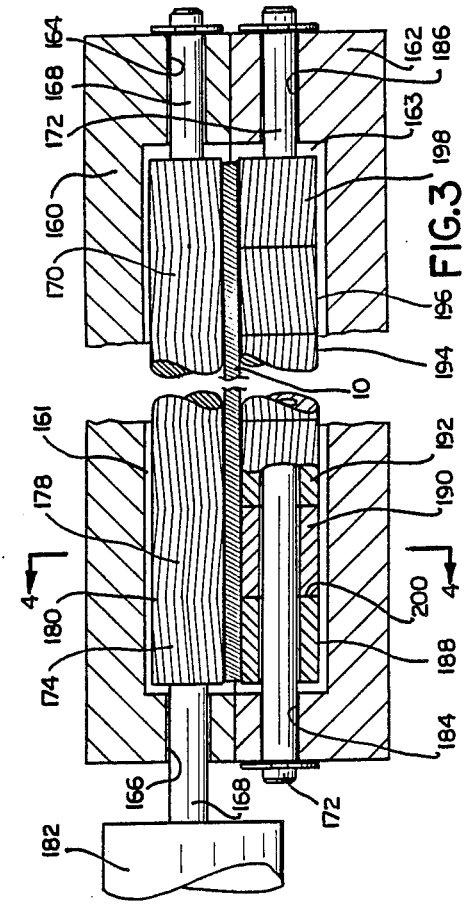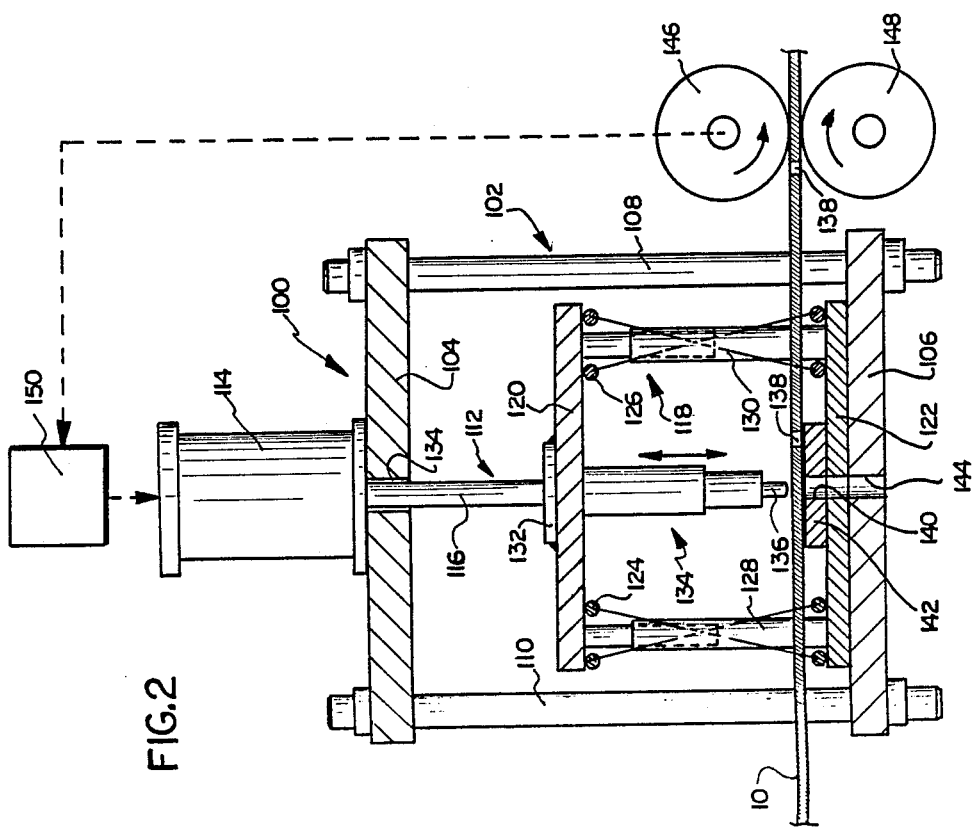

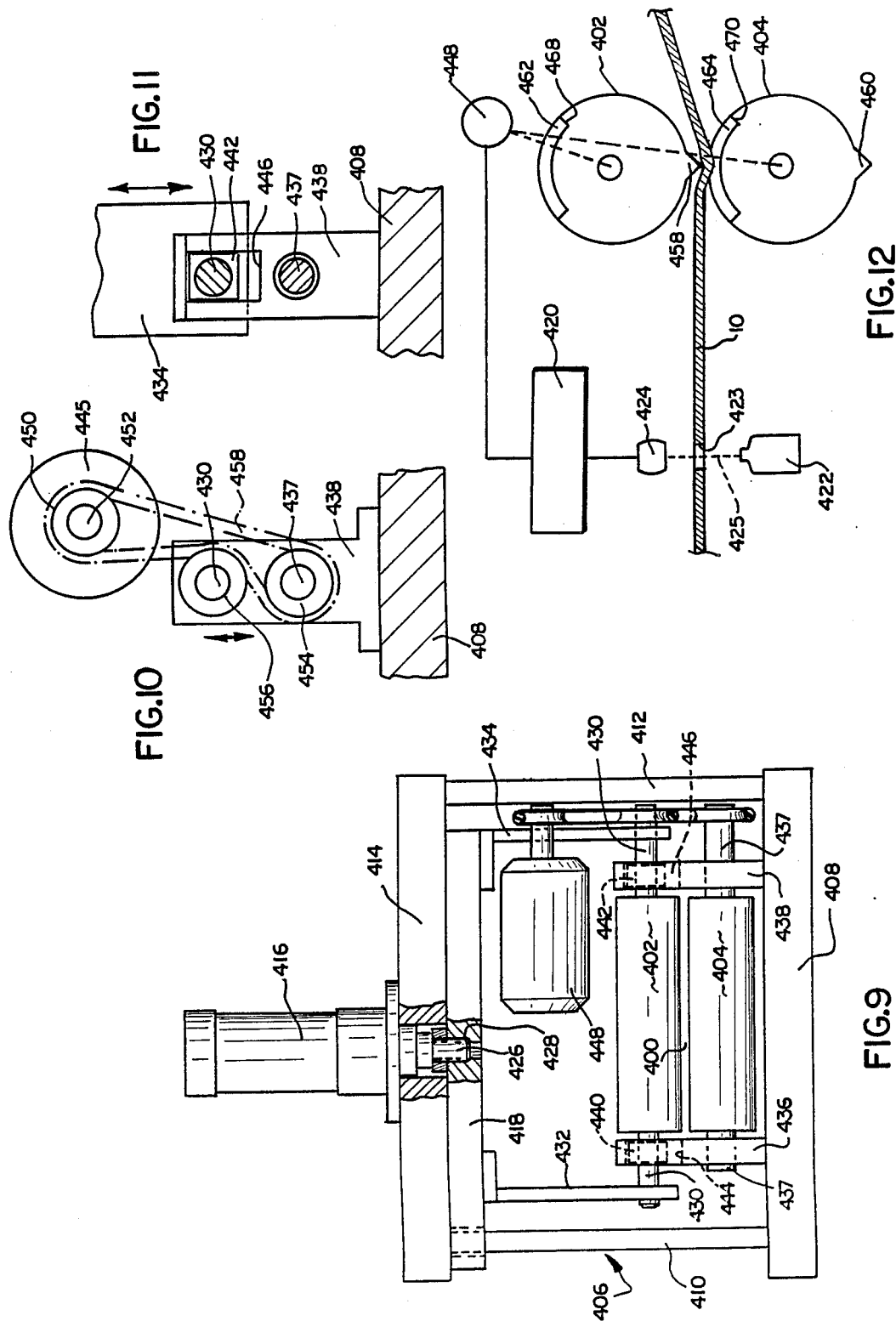

PROCESS FOR MAKING METAL SUBSTRATE CATALYTIC CONVERTER CORES

This invention relates to a process and apparatus for making catalytic converter cores from strip metal and in more particular embodiments to a continuous process and apparatus for making catalytic converters. The converter cores and converters produced in accordance herewith are especially adapted for use in the treatment of exhaust gases emanating from internal combustion engines or industrial processes to render noxious components thereof harmless or to reduce the concentrations of such components to acceptable levels before entering the general atmosphere.

BACKGROUND OF THE INVENTION AND PRIOR ART

Since the middle 1970's catalytic converters have been required equipment for treatment of the exhaust from internal combustion engines in vehicles. The primary purpose of these devices is to convert by catalytic means noxious exhaust components of hydrocarbon fueled engines into harmless materials, e.g. carbon dioxide, water and nitrogen, and more recently to trap and oxidize products of incomplete combustion, e.g. particulates such as carbon frequently generated in annoying quantities by diesel powered engines.

Up to the present time, the supports for the catalyst or catalysts and particulate traps which effect the desired pollution reducing effects have been made from ceramic materials in the form of the familiar "honeycomb". The inner walls of these monolithic honeycombs are coated with a precious metal catalyst, or a plurality of catalysts, such as platinum, palladium and/or rhodium.

Hot exhaust gas coming into contact with the surfaces carrying the catalyst material undergoes chemical change to harmless materials. An early embodiment of a metallic catalyst carrier is described in U.S. Pat. No. 1,636,685 dated July 26, 1927 and issued to Downs. According to Downs, iron particles are treated by dipping into melted aluminum or by milling with powdered aluminum.

In a process called calorizing there takes place an alloying action between the aluminum and iron. The iron/aluminum surface provides a very satisfactory surface upon which to deposit catalytic materials, e.g., oxide catalysts such as metal of Groups V and VI of the Periodic Table. These structures are adapted for vapor phase catalytic oxidation of organic compounds.

U.S. Pat. No. 2,658,742 dated Nov. 10, 1953 to Suter et al discloses a metallic catalyst support for removing harmful ingredients from exhaust streams. Platinum and palladium are disclosed as useful to aid in combustion of combustible materials, e.g. carbon monoxide. Stainless steel is disclosed as a base metal for the catalyst. The base metal may be in the form of a wire or screen or other physical form. Another patent to Suter, U.S. Pat. No. 2,720,494 dated Oct. 11, 1955 discloses a process for the preparation of a catalytic element. Platinum or palladium or a mixture of the two noble metals in a catalytically active form may be used on a metallic substrate such as stainless steel, Nichrome or Chromel.

Bernstein et al in U.S. Pat. No. 3,773,894 disclose a metallic catalyst supported on a metallic substrate as a catalytic converter for internal combustion engine exhaust gas. Various physical forms of the catalyst support are shown including a spiral wound screen and a cordierite honeycomb.

U.S. Pat. No. 3,059,326 dated Oct. 23, 1962 discloses iron/aluminum cores having substantial oxidation resistance.

U.S. Pat. No. 3,254,966 to Bloch et al dated June 7, 1966 discloses a structure for effecting catalytic conversion of exhaust gas streams. The catalytic element includes a housing having spaced perforate walls, a mat of strand-like, all metal catalytic material filling the interior of the housing, a plurality of relatively small perforate containers in spaced relationship within the compact mat and surrounded by the all-metal catalytic material, and a filling of particulate catalyst, e.g. alumina spheres coated with a catalytic material of the platinum metal group.

Other U.S. Patents of interest in this field include the patent to Brewer U.S. Pat. No. 3,867,313 dated Feb. 18, 1975 relating to an all-metal catalyst element provided by depositing a noble metal, e.g., platinum and/or palladium plated or deposited onto a nickel-free aluminum, chromium and iron alloy. The patent to Oshima U.S. Pat. No. 3,873,472 also related to a catalytic system for treating exhaust gases. The base metal is an iron/aluminum alloy. Before application of the catalyst, any aluminum oxide on the surface of the substrate is carefully removed. See also U.S. Pat. No. 3,903,020 dated Sept. 2, 1975 to Sergeys et al which discloses the use of ceria as a stabilizer and activator for the catalyst. See also U.S. Pat. No. 3,907,708 to Lacroix dated Sept. 23, 1975 directed to a metal support, a metal aluminide layer, and a catalytic surface layer on an alumina layer of the gamma or eta type. Various catalyst element structures are shown. U.S. Pat. No. 3,957,692 to Cairns et al dated May 18, 1976 discloses another method of preparing a catalyst by sputtering and bombarding with a source of energetic ions.

Volker et al U.S. Pat. No. 4,188,309 dated Feb. 12, 1980 discloses various shaped catalysts utilizing a structural reinforcing agent consisting of iron or steel, an iron aluminum diffusion layer and a catalyst. U.S. Pat. No. 4,300,956 dated Nov. 17, 1981 to Rosenberger et al discloses a convolute-wound corrugated/non-corrugated metal sheet having metal-to-metal diffusion bonds. The unbonded surfaces are oxidized to improve their adhesion to the later applied catalyst.

The Retallick U.S. Pat. No. 4,301,039 dated Nov. 17, 1981 discloses a method of making a metal catalyst support in a spirally wound form whereby indentations in the surface will not nest together. U.S. Pat. No. 4,318,888 dated Mar. 9, 1982 and issued to Chapman et al discloses a spirally wound foil structure having a corrugated surface and distinct catalysts on confronting surfaces.

U.S. Pat. No. 4,402,871 to Retallick and issued on Sept. 6, 1983 discloses a honeycomb catalyst support formed by folding a single layer of metal back and forth upon itself. Each layer in the honeycomb has indentations of uniform height so that the spacing between layers is equal to this height. A different pattern of indentations is used on alternate layers, and the indentations are on opposite sides of the strip in alternate layers. This structure prevents nesting of confronting layers.

The more recent structures are made of a thin ferritic stainless steel strip of the type referred to by Kilbane in patent application Ser. No. 741,282 filed June 4, 1985, and by Retallick in patent application Ser. No. 738,485 filed May 28, 1985, corrugated and fan folded or folded back and forth upon itself. The surface of the strip is provided with a catalytically active agent for decontaminating an exhaust gas, e.g., the exhaust gas generated by an internal combustion engine. Reference may also be had to Cornelison patent application Ser. No. 796,710, filed Nov. 12, 1985, which discloses a catalytic fan-folded element of the type which can be produced by the present process.

Honeycombs made according to a preferred practice of the present invention cannot telescope. These honeycombs are made by folding a single strip of metal back and forth upon itself. The folded strip is placed in a canister and then the folded strip is anchored in the canister by a lip, a flange, or a crimp that goes around the periphery of the core formed from the folded strip. Every layer of the core is anchored individually so that there can be no telescoping.

Another method of anchoring each layer individually is shown in U.S. patent application Ser. No. 650,085, entitled "Catalytic Converter for an Automobile".

A principal object of this invention is to provide a process for making a catalytically active core for a catalytic converter, and in more specific aspects a continuous process for making such cores and ultimately placing the cores so made in a suitable housing. This process has a number of advantages over the commonly used ceramic cores: (1) the entire operation can be carried out at a single location instead of two or more locations, (2) labor and transportation are greatly reduced, (3) very wide cores (over 6" length) can be coated front to back and along the length of the strip uniformly, (4) cores can be selectively coated front to back and (5) the face cross section of the catalyst can be of any geometric configuration.

BRIEF STATEMENT OF THE INVENTION

Briefly stated, the present invention is in a process for making a metallic catalyst support or core which comprises the steps of corrugating a thin ferritic metal strip, applying a coating of a refractory metal oxide to the surface of said strip and then drying and calcining the coating.

Thereafter, a precious metal catalyst is applied to the refractory metal oxide surface. The coated metal strip is then optionally coined to form alternating fold line creases extending between the marginal edges of the strip and located at the perforations formed therein. The coined metal strip is then gathered in a fan folded manner to form the core. The core may then be inserted in a suitable housing to provide a catalytic converter especially suited for use in treating the exhaust gases emanating from an internal combustion engine. Alternatively, the strip may be spirally wound to form a catalytic core member.

BRIEF DESCRIPTION OF THE DRAWINGS

The invention may be better understood by having reference to the annexed drawings wherein:

FIG. 1 is a diagrammatic and schematic illustration of an apparatus for the continuous production of a catalytic converter from a coil of stainless steel all the way to a finished catalytic converter.

FIG. 2 is a cross-sectional view of a punch press used for perforating the stainless steel strip at predetermined intervals.

FIG. 3 is a fragmentary longitudinal cross-sectional view of corrugating rolls for imparting non-nesting corrugations to the stainless steel strip.

FIG. 4 is a cross-sectional view of the corrugating roll as it appears in the plane indicated by the line 4—4 in FIG. 3.

FIG. 9 shows in partially cut-away elevation, the apparatus for continuously creasing the catalyst coated corrugated stainless steel strip at predetermined intervals.

FIG. 10 is a partially cut-away end elevation showing the drive means for the creasing rolls shown in FIG. 9 as such means appear in the plane indicated by the line 10—10 in FIG. 9.

FIG. 11 is a fragmentary end view, partially cut-away, showing the mounting means for the motor and roll drive system, which allows for vertical movement.

FIG. 12 is a diagrammatic and schematic cross-sectional view on an enlarged scale illustrating creasing rolls such as those shown in FIG. 9 together with means for rotating the rolls through 180° of rotation in response to means for sensing a perforation through the stainless steel strip and whereby creases are alternately created on opposite sides thereof.

DETAILED DESCRIPTION OF THE INVENTION

Figure 7:
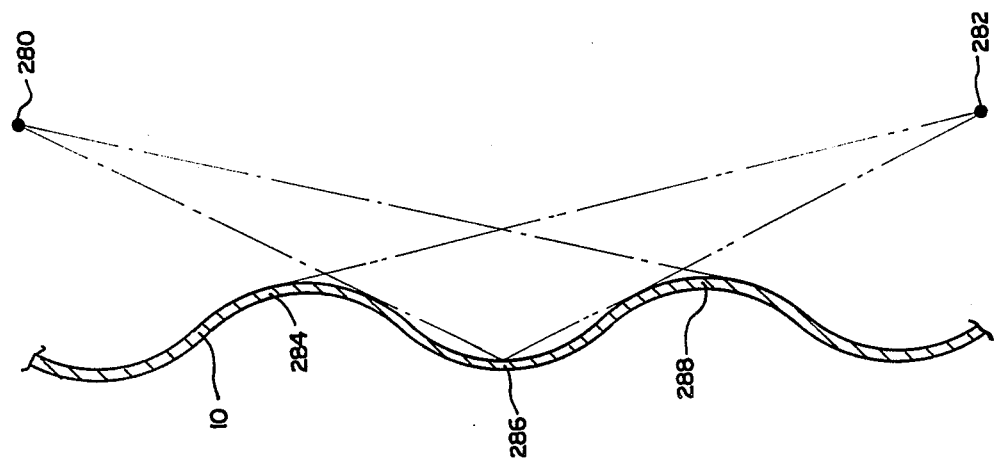
FIG. 7 shows a section of the corrugated steel strip in cross-section and on enlarged scale and the relative positions of the washcoat applying spray guns, the nozzles thereof being shown as black dots.

In the following detailed description, the best mode of carrying out our invention will be described, it being understood that certain of the steps discussed are optional and further that the steps need not necessarily be carried out in the order named. The locations where specific operations are performed will, for convenience, be referred to as "stations", and will be identified by upper case letters throughout this disclosure.

For convenience, the stations in preferred sequence are listed and identified as follows:

Station A is an aluminum coated stainless steel strip supply station.
Station B is an annealing station.
Station C is a strip straightening station.
Station D is a perforating or punching station.
Station E is a corrugating station.
Station F is a lubricant removal station.
Station G is a washcoat applying and calcining station.
Station H is a first catalyst applying station.
Station I is a second catalyst applying station.
Station J is a third catalyst applying station.
Station K is a stabilizer applying and drying station.
Station L is a strip creasing station.
Station M is a cut-off station.
Station N is a folding station.
Station O is a core insertion station.
Station P is a shell application station.
Station Q is an end cap welding station.

Station R is a final inspection station.

Station S is a packaging station.

Referring now in greater detail to FIG. 1, there is here shown a stainless steel base metal strip 10 partially shown in dotted line and after creasing at station L as a zig-zag line 12. The starting material for the present process is an aluminum coated ferritic stainless steel foil having a thickness of from 0.0015 inch to 0.0030 inch and a width of from 1.50 inch to 24.00 inches or more as may be desired. The strip is obtained in the form of a coil 14 having an internal diameter of about 12 inches and an outside diameter of about 24 inches. The coil 14 is mounted onto the spindle of a motor driven uncoiler 16. The strip 10 as it leaves the uncoiler 16 forms a loop indicated at 20 on its way to the next station. The length of the loop 20 controls the turning on and turning off of the motor-driven uncoiler 16. A suitable sensor system indicated at 18 and 19, such as an electric eye or Hall Effect sensor may be used to detect the length of the loop. When the loop fails to obstruct the path between sensors 18 and 19, a signal is generated that starts the motor-driven uncoiler 16 until the path between 18 and 19 is again obstructed, and the motor-driven uncoiler 16 is stopped. The ends of successive coils 14 are spliced or welded together to assure a continuous web to the process line of FIG. 1. Commercially available uncoilers 16, sensors 18, 19 and welders (not shown) are used at Station A.

Station B in FIG. 1 is a heat treating station for annealing the aluminum coated stainless steel strip 10. The aluminum coating may be applied by vapor deposition, sputtering, arc deposition, or by dipping the stainless steel strip in molten aluminum at the supplier's plant, and may be subsequently rolled to foil. Any of these processes may be part of the process line described herein. As processed, the aluminum coated strip has a shiny, mirror-like appearance and is tempered. The strip is fully annealed when it reaches a temperature of 1625° F. The temperature must not exceed about 1700° F. to avoid embrittlement due to changes in the grain structure. It is the purpose of station B to anneal the foil 10 consistently within the above temperature range. The foil 10 is annealed before the metal forming stations C, D and E, for example, because experience has shown that the unannealed foil 10 has a tendency to tear, particularly during the corrugating step, necessitating shut down of the line.

Heat treating of the foil 10 also causes oxidation of the aluminum surface of the strip 10 to form a coating of aluminum oxide thereon. This oxide layer is most readily formed at a temperature between 1400° F. and 1600° F., as detailed in the aforesaid Kilbane patent application Ser. No. 741,282. Moreover, the heat treatment allows aluminum at the interface between the aluminum coating on the stainless steel substrate to diffuse into the stainless steel which enhances the oxidation resistance of the substrate at the high temperatures it will encounter in service, the latter being typically 1200° F. to 2000° F. There is formed in the substrate an iron aluminide. Also, the formation of aluminides blocks migration of iron to the surface. An excess of iron has the effect of poisoning the noble metal catalysts thereby rendering them ineffective for their intended purposes. Moreover, the heat treatment causes the aluminum coating to diffuse into the stainless steel, to form a surface having microscopic roughness. The coating of refractory metal oxide, e.g. activated alumina, to be applied at station G adheres well to this surface.

In the apparatus shown in FIG. 1, station B includes a tube furnace 22 shown in a vertical attitude. It may just as well have been horizontally disposed. The inside dimension of the furnace is 2"×8", for example, which is adequate to accommodate a strip which is 7.5 inches wide. The furnace walls are desirably 2 inches thick and have a K-factor of less than 0.1 BTU/hr-ft°F. End baffles, not shown, may be used to hold heat loss to within acceptable limits.

Infrared sensors, not shown, are desirably mounted opposite quartz window ports in the sidewalls of the furnace, and sense the temperature of the strip itself. The signal generated by the sensors is fed into a servo system (also not shown) which controls a full wave bridge rectifier, which in turn supplies variable power to the heaters to control the foil temperature to within 15° F. of the set point of the controllers. The tube furnace and the controls therefor are constructed of commercially available components and installed in a known manner. All of the furnaces described herein, and particularly those used in stations H, I, J, and K discussed below have essentially the same materials of construction and controls.

Station C is a straightening station. It is preceded by a loop 24 much in the same manner as the loop 20 and for the same purpose. The foil strip 10, as a result of processing at a rolling mill, has inherent camber which must be eliminated on a continuous basis at this station. As received, commercially available foil typically has a camber of ⅛ inch to ⅜ inch in an 8 foot length measured against a straight edge. A camber of more than about ⅛th inch in 8 feet makes an unacceptable metal substrate catalytic converter because the face of the finished converter cannot be made flat. This, in turn, causes unacceptably high compressive forces to be exerted on the edges of some of the individual folded strips as the core is held in the container or can.

The foil 10, which is usually 0.001/0.003 inch thick, has a yield strength of approximately 60,000 psi. It can, therefore, be stretched between the shafts of a controlled torque drag clutch and tensioning rolls spaced apart 4 to 12 feet. With a tension of 100 to 500 lbs. the side of the strip 10 that exhibits the inward or concave camber can be stretched beyond its yield point and the corresponding edge made parallel relative to the opposite side of the strip 10. The absence of camber assures that the successive accordion folds in the completed converter are flush with one another so that each end of the converter core is flat and in a plane normal to the axis of the converter.

Tensioning is carried out at station C with a stretcher-leveler 26 including rubber covered drag and tensioning rolls 20 to 30 constrained by magnetic particle clutches (not shown) or a bridle feed at the corrugating station E described below. In the case of the stretcher leveler, the tensioning force is controlled by servo feedback from edge guide controls at the input and output sides of the straightening station C. The major pieces of equipment for either of the options mentioned above are commercially available, although the use thereof for foil straightening in a continuous catalytic converter process line is believed to be novel.

Station D is a perforating or punching station. The station D is used to define the length of chords in the corrugated folded laminations in metal substrate catalytic converters as distinct from single or double-wound spiral cores. The length of the chords is manifested by successive hinge lines or fold creases which define a fold location and enhance the ease and speed of folding. The accordion folded or fan folded laminations made in this manner form layers of mixed flow cells or channels for the flow of exhaust gas through the core and which, compared with the tubular cells found in ceramic monolith converters, enhance molecular contact between the converter surfaces and the pulsating exhaust streams from internal combustion engines. The laminations or layers of the continuously corrugated foil must be held at the edges in order to avoid telescoping of the catalytic medium during use due to the pulsations caused by engine operation. These pulsations tend to cause axial movement of the lamina with eventual destruction of the mechanical integrity of the device.

Any cross-section geometry of the catalyst face required for an application can be fabricated by varying the length of the chords defining the location of successive accordion folds as measured along the length of the strip of foil 10. The repeating pattern of chord lengths is unique for each converter design and allows virtually any cross-sectional geometric configuration to be made. Thus, the cross section may be elliptical, round, rectangular, triangular or irregular in shape as dictated by envelope restrictions in automotive and other applications that are space critical.

The location of the perforations along the strip 10 is conveniently controlled by a computer 34 (FIG. 1). Computer generated signals pursuant to a program such as discussed below, actuate pneumatic controls and cylinders in a punch press best shown in FIG. 2 to create a single 7/32 inch diameter hole, for example, at the hinge line location of the successive accordion folds. Alternatively, a series of perforations extending along a line perpendicular to the marginal edges of the strip 10 at program controlled intervals may be generated. Such perforations may desirably be 7/32 inch dia., for example. When the strip is folded along the median line of such a series of perforations, the resulting indentations are conveniently arranged for coaction with internal ridges or ribs in the housing to prevent telescoping of the catalytic medium due to engine exhaust pulsation, as covered in Retallick patent application Ser. No. 650,085 filed Sept. 13, 1984, and Ser. No. 763,975 filed Aug. 9, 1985, and Cornelison patent application Ser. No. 796,710 filed Nov. 12, 1985, supra.

In an alternative embodiment of this invention, the computer controller 34 may be located just prior to the coining station L discussed below and the above-described punch operation eliminated (station D). In this case the encoder coupled to a shaft (not shown) on which are mounted soft supporting sponge drive rolls, over or between which the foil 10 travels substantially as shown at 30 in station C, measures the length of the corrugated stock, and signals the computer, which causes the coining machinery to define by coining the appropriate chord lengths between successive hinge lines or fold lines.

An advantage to having the computer and coining operation at the coining station L is that the chord length can be held more accurately because the effects of stretching the corrugated web at any intervening stations are eliminated.

In addition to the computer 34 and its software, the equipment at this station D desirably includes a 4 inch diameter pneumatic cylinder of low inertia and short stroke which is fired by a signal from the computer pursuant to its software. This device is best shown in FIG. 2 discussed below.

The computer is commercially available from retail outlets. The punch and die and the die set are also commercially available. A magnetic drive pulley, consisting of a 0.020 inch stainless steel tubular shell, 36 and 37, mounted on two formed aluminum ends with permanent magnets secured to the inside of the shell, is motor driven and continuously delivers foil to the punch unit. Another magnetic pulley of like construction 30 pulls the foil through the punch unit 32 and causes a neoprene roll 40, with an encoder (not shown) on the same shaft, to rotate and indicate to the computer 34 the exact length of foil being fed into the punch station. This feedback enables the computer 34 to sense the location of the strip and send a signal, as required by the program, to punch successive holes that define the hinge lines.

Station E is the corrugating station. The details of this station are shown in greater detail in FIGS. 3 and 4. Station E feeds and forms the foil strip 10 between opposed rolling gears. These corrugations can be straight, chevron (i.e., zig-zag) or sinuous in shape across the width of the strip 10 depending upon the requirements of the application. When the strip is folded upon itself, the corrugations form channels for the flow of gas. Whether the corrugations are straight or chevron, they are always inclined to the perpendicular to the axis of the strip. Because of this inclination, the corrugations in adjacent layers cross over one another and do not nest together. In any case, the successive layers of corrugated foil form cells through which the pollutant-containing gas passes for contact with the catalytic surface of the corrugated foil 10.

The laminations of the chevron-shaped corrugations can be folded back and forth in accordion style or fan folded style to form, without nesting, "mixed flow cells". Each layer of corrugated foil is held at its edge at the hinge line to prevent telescoping in the pulsating environment of use.

For use in nonpulsating applications, wound cores can be made by folding over a predetermined length of corrugated foil at its midpoint and then spirally winding the pair of foils together. See Chapman U.S. Pat. No. 4,318,888 dated Mar. 9, 1982. Alternatively, a flat strip of foil (without corrugations, but with catalyst) and a corrugated strip can be wound together to form a converter core. (We have made elliptical cores this way.)

The straight or chevron types of corrugations in the foil are formed between a pair of hardened straight or herringbone gear sets as will be more clearly set forth in connection with the discussion of FIGS. 3 and 4. The gear sets are held in opposing slots in hardened steel, high density plastic or titanium plates. One of the gear sets is mounted on a drive shaft and driven at speeds ranging from 200 to 1000 rpm as may be dictated by the strip speed. The drive motor is a variable speed motor or a pair of variable speed motors mounted at opposite ends of the drive shaft. A variable force normally from one or, more desirably, two pneumatic or hydraulic cylinders or electrically driven drive screws is delivered through a press frame to the hardened steel plates. In this manner the depth of the corrugations is regulated and controlled until the desired corrugation height is obtained.

Gears having a contact ratio of 1.0 or slightly less than 1.0 are best suited for use in corrugating the steel foil 10. Reference may be had to the patent application of William B. Retallick, Ser. No. 826,896, filed Feb. 6, 1986, for details of the corrugating gears. In a preferred embodiment, the outside diameter of the gears for corrugating the foil is about 0.5 inch.

In order to increase the length of service of the gears, a lubricant is used and we have found that for best results and ease of removal from the surface of the corrugated strip, glycerine is a preferred material. Any suitable means for flooding the nip between the gears and on both sides of the stainless steel strip 10 as it moves between the gear sets may be used. Excess lubricant may be recovered, filtered, and if desired, dried, for reuse.

As shown in FIG. 1, after leaving the corrugating station E, the now corrugated strip is reeved through a series of fixed and movable reels, the former being located above the latter. In the embodiment shown in FIG. 1, four fixed reels 44 are mounted for revolution on an elevated bracket 46, and three movable reels 48 are located near ground level indicated by the heavy black line 50 in FIG. 1. The purpose of this arrangement of fixed and movable reels or pulleys 44 and 48 is to accommodate changes in the line speed which occur from time-to-time, such as during the securing of a new strip to the end of the prior strip which operation requires interruption of the line feed from the supply reel 16. The strip 10 may continue to be fed through the balance of the process line by the storage system generally indicated at 52 during which the distance between one or more of the movable pulleys or reels 48 and the fixed reels 44 is decreased as strip 10 is removed from storage in the absence of input strip 10 from the corrugating station E. Several of these strip storage devices are used along the process line to allow for deviations in the strip speed and will be referred to merely as strip storage devices, it being understood that the operation thereof is essentially as described above.

Station F is a lubricant removal station. In preparation for the application of a washcoat of aluminum hydroxide or alumina slurry, the lubricant utilized in station E must be removed. This is quite easily achieved by running the strip 10 through a column heater maintained at a temperature sufficient to vaporize and burn off the glycerine lubricant, e.g. at about 1200° F. Glycerine has the advantage that it is completely decomposed at this temperature without smoking or charring to environmentally acceptable gases, carbon dioxide and steam.

Station G is a washcoating station where a relatively heavy layer of aluminum oxide is coated onto the already existing aluminum oxide surfaces of the stainless steel substrate. The coating material is in the form of a slip or slurry and contains catalyst carriers, modifying agents to improve the rheology of the system and catalyst promoter. The various components of the slip or slurry may include, therefore, alpha alumina, gamma alumina, ceria, silica, titania, zeolites and vandium oxide or mixtures thereof, all suspended in water. Suitable suspending agents my also be added to assist in minimizing settling. A suitable slurry supply tank (not shown) is, of course, continuously stirred or agitated.

The preferred washcoat thickness has been found to be between 15 and 50 microns depending on the requirements of particular applications. The washcoat coating is most effective when it is uniform over the flanks, peaks and valleys of the corrugations. This will be discussed in greater detail with reference to FIGS. 6 and 7. After the application of the washcoat in a spray booth, the strip 10 enters first a drier operated at 200° to 300° F. and then a calciner operated at a temperature above about 800° F., e.g. 850° F. to 950° F.

Figure 6:
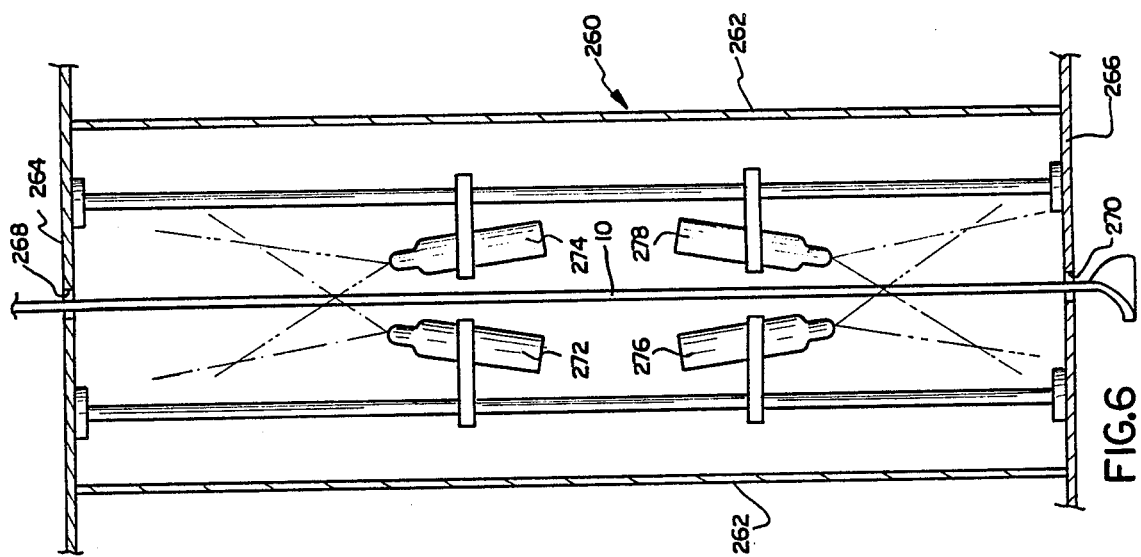
FIG. 6 is a diagrammatic and schematic view in partial cross-section showing an apparatus for applying a washcoat to the surface of the corrugated stainless steel strip.

The coating equipment includes spray heads with 0.020 inch diameter orifices to coat a herringbone or zig-zag corrugated strip 10. Air delivery is 5 to 20 standard cubic feet per minute (scfm) through each nozzle. As shown in FIG. 6, the spray guns are located inside a spray booth fitted in a conventional manner with an exhaust blower (not shown) to carry away any overspray. It has been found that best results in coating the corrugated strip are achieved when the axis of the guns is normal to the flanks of the corrugations (see FIG. 7 and related description). Recovery of overspray and reslurrying means are desirably provided.

After passing through the spray booth 58, the strip 10 enters a heating tower 60 to dry the coating and then on into a calcining tower 62, both towers being coaxial and vertically disposed in the preferred embodiment. Drying takes place essentially at about 250° F. to 350° F. and the calcining operation is carried out at a temperature above about 800° F., e.g., 850° F. to 950° F.

The washcoating operation can be done in a single tower 60 or in multiple towers, depending on the required washcoat thickness. Alternately, the initial coating can be done by any of the coating methods mentioned below, followed or preceeded by the spray washcoating method 58, 59 and 60.

There is a number of other means for applying the aluminum oxide coating on the surface of the strip 10. These include brushing, rolling (as with a paint roller), dipping, electrostatic coating, ultrasonic spraying, etc. Air spraying as described above is preferred as the most economical in terms of equipment and operation.

Alternatively, the strip 10 can be moved through an electrostatically charged fluidized bed of suspended washcoat particles. The particles may be created by forcing the slip through an ultrasonic nozzle for discharge into a chamber held at a temperature sufficiently low to freeze the fine particles, e.g., 10° F. The droplets are kept in a fluidized state and moved into an electrostatic field where they are charged and attracted to an oppositely-charged metal strip 10. The particles are attracted to and electrostatically held on the surfaces of the strip 10, front and back. As the strip emerges from the fluidized bed and enters a drying furnace, the particles melt and distribute themselves uniformly over the surfaces of the strip 10 and the washcoat is subsequently calcined.

A principal advantage to electrostatic application of the slip is that (1) there is no washcoat overspray waste and, (2) it permits inclusion in the slip or slurry of water soluble low cost metal catalyst material or materials, without catalyst loss caused by overspray wastage. Presently, however, air spray application is preferred.

After leaving the calcining tower 62, the strip 10 may conveniently pass through another fixed and movable pulley storage system 64 which operates as above described.

Station H is the point where one catalyst material is applied. Succeeding stations I and J are also provided in the preferred process for application of catalyst material to the aluminum oxide coated surface. Station K is also provided for the application of a stabilizer, ceria, from an aqueous solution of water soluble cerium salt. These four stations are virtually identical in construction and operation and thus, only one need be discussed in detail.

The washcoated surface is quite porous and absorbs solutions of catalyst material readily. The objective in these stations H, I, J, and K is to impregnate the washcoat with the solutions of catalyst to near saturation, or incipient wetness, e.g., the point where liquid just begins to run down the surface of the vertically disposed strip 10, to accurately control the deposition of the noble metal compounds and to maintain a record of the amount of catalyst weight deposited on each converter as it passes through at each station. The strip 10 enters the tower 66 at its lower end and passes into a box 68 which is shown in greater detail in FIG. 8. Box 68 is fitted, as will be described below in connection with FIG. 8, with a plurality, e.g. 3 to 7 ultrasonic spray heads disposed on each side of the strip 10. Fewer spray heads may be used if the width of the strip 10 is less than 7.5 inches. The spray heads which are commercially available, discharge by spray means, a mist of the noble metal compounds platinum, palladium, rhodium, respectively, normally present in aqueous solution as water soluble amines, into a substantially sealed chamber 68. Chamber 68 is maintained under a vacuum of 0.01 inches to 1.0 inches of water. The noble metal compounds that are sprayed into the chamber 68 are either deposited on the strip 10 to substantially saturate the surface or pass the strip as overspray. The residual condensate and overspray is collected in the chamber 68 and drawn by the vacuum means into a condenser (not shown) and collected for recovery and recycling.

Two scales may be used to determine the net amount of noble metal deposited on the strip per unit area. "Unit area" is the integral over time of the line velocity and strip width. A precision scale with electronic output weighs the noble metal solution in the supply flask (see FIG. 8) at any particular time, and another precision scale (not shown) weighs the noble metal compound in the recovery flask. The signals from the two scales are compared when they are fed into a bridge circuit or computer with read out and logging capability, and the net output signals a servo system which governs and keeps constant the amount of coating per unit area of strip. The elements of apparatus are well known and commercially available. The rate of deposition per unit area is recorded on the associated data logging equipment. The net weight of solution per unit area to the strip is a primary method of process control for each of the noble metal coating stations H, I, J and K.

A control to check calibration of the above instrumentation contemplates cutting or punching coupons from a section of the finished strip, removing the noble metals chemically, as with hot sulfuric acid, and running a simple quantitative analysis.

The impregnated strip 10 is then dried in a tunnel furnace 70 at a temperature in the range of from 200° F. to 300° F., after which calcining takes place in the upper region of the tunnel furnace 70 at a temperature above about 400° F. to 500° F. Alternatively to strip heaters normally used in the tunnel furnaces described herein, the strip may be heated by induction heaters operating directly on the strip 10.

As indicated above, stations I, J, and K are used for the application of platinum, rhodium, and cerium or other rare earth, titanium or other promoters in the same manner as described for station H.

One of the important discoveries made herein is that the catalytic solutions are desirably applied individually because of the tendency of the water soluble salts to interact in a manner that adversely affects the catalytic action. Thus, the catalysts should be applied and calcined individually in the separate towers or stations H, I, J, and K.

Following station K, where ceria or other stabilizers are conveniently applied, the strip 10 passes through another continuous strip storage system 65 like that preceding station F (FIG. 1). This system accommodates changes in the line speed caused by subsequent operations.

Station L, which follows the application of the catalyst and stabilizer systems to the aluminum oxide coated strip 10, is a coining station. The coining station L defines the length of the chords of the finally folded catalytic member. The length of the chords will depend upon the final geometric configuration of the catalytic member. Thus, if the final configuration of the catalytic member is to be in the form of a rectangular prism, each chord length will be the same.

Where the catalytic member is to have a cylindrical configuration, the chord lengths will vary in length substantially in accordance with successive chords of a circle. A computer may be used to determine the chord length for a wide variety of geometric configuration. Alternatively, the configuration of the catalytic member may be cylindrical or oval formed by winding in a spiraliform manner with or without an inner mandrel. In the latter case, the coining operation may be omitted.

One form of coining machine useful in the present process is shown in greater detail in FIGS. 9–12. The coining operation is performed alternatingly on either side of the strip 10 so that fold creases are coined into the strip to form the zig-zag strip form 12 exiting from station L. The device shown in FIGS. 9–12 includes a pair of rollers mounted on parallel axes. These rolls each have a knife edge and a resilient pad mounted 180° apart. Means are provided for sharply moving the rolls together with the strip 10 in the nip between the superimposed rolls which causes the knife to move into the resilient pad a distance sufficient to crease the strip 10 at the point of impact. Immediately thereafter, high speed stepping motors, or a single motor and pulley system, effect rotation of the rolls 180° whereby the positions of the knife and the pad are reversed with respect to the side of the strip 10. The rolls are again sharply brought together against the strip to form an oppositely directed crease or fold line and hence the zig-zag configuration of the strip 12. The movement of the rolls together is on command which originates either from an electric eye sensing a hole punched through the strip 10 at the computer controlled punching station E as above described or from a signal from the encoder.

Station M is a cut-off station including a knife or cutter that is programmed to cut the strip 12 at the end of each series of chords as defined by the computer. A typical repeating pattern would be in the range of 5 feet to 90 feet, depending on the cross-sectional area of the core, at the end of which pattern the knife automatically cuts the strip. Conveniently, the equipment consists of a knife and an aluminum (low inertia) die set which is driven on command by a low inertia pneumatic cylinder.

Station N is a folding station. At this station the zig-zag strip 12 is gathered up or folded on the hinge lines impressed in the strip 12 as described above. These hinge lines press through and eliminate the corrugations by deforming the steel beyond its yield point, thus making it relatively easy to gather up the strip and make the accordion or fan folds.

A conveyor belt 72 along which the severed strip travels is a convenient site from which an operator may gather up the strip and fold it by hand.

Alternatively, the strip can be fed into the top of a vacuum chute 74 at the bottom of which is a sliding drawer 76 which travels to and fro and is driven by the operator. Once introduced into the vacuum chamber 74, the strip segment 12 will be compacted one fold at a time until the core is entirely contained on one of the compartments of the sliding drawer 76.

Stations O, P and Q are final assembly stations where the cores are first inserted into a hollow steel cylinder or oval shell as may be desired or as dictated by the folding configuration. The wall section of the primary container is conveniently 16 gauge stainless steel. In station P, the assembly is inserted into a suitable canister and at station Q, end caps are welded onto each end of the canister.

Station R is a final inspection station, and the articles are packaged in Station S. Stations N to S are not further discussed herein.

A detailed description of the previously mentioned important stations is as follows:

THE COMPUTER PROGRAM

As indicated above, the cross-sectional configurations of the catalytic cores produced herein are many and varied. Whether the cross-section is rectangular or square, or circular, or some irregular configuration combining straight and curved lines, e.g. basically triangular having straight or curved sides with rounded apices, the catalytic core can be viewed as built up of a series of layers of fan folded material having chord lengths which vary or not depending on the cross sectional shape of the envelope or housing into which the core is to be inserted.

Calculation of the chord lengths can be achieved by a suitable computer program such as described below.

In the first step, the dimensions of the can or canister are entered assuming the perimeter is composed of arcs and corners. As each is entered, the path from the previous arc or corner is calculated and all of this information put into a matrix. Future versions are expected to accommodate figures composed of elipses and other shapes defined by polynomials.

Chords are aligned parallel to the y-axis, i.e., vertically. To accommodate horizontal chords one may rotate the drawing by 90 degrees, or one may use a SWAP command to switch x and y coordinates in the matrix and retitle the x heading as y when the information is input (GOSUB A).

Arcs which cross the horizontal line through their respective centers are replaced with multiple arcs. This avoids ambiguity about whether the y value for a given x is above or below the line (GOSUB B).

Miscellaneous data is entered related to the chord geometry, such as circumference, thickness, bend, contraction, correct height and edge (GOSUB C).

Starting at the minimum x value, the program moves in a positive x direction (left to right across figure). For each x value, the program calculates the chord length. For the current upper and lower matrix, the vertical difference between them is calculated (SUB D) and the totals updated (SUB E) (GOSUB F).

The subroutines are as follows:

The first subroutine accommodates the entry of data including allowance for contraction due to the impression of corrugation, the height of the corrugation, the distance between the edge of the can and the center of the first strip. Thereafter, the dimensions of the can or container are entered. The number of arcs or corners is entered, and then the data for a single segment.

A subroutine (Gosub G) for entering arc or corner data into a temporary matrix is provided whereby x and y coordinates are entered.

A loop is entered to capture each new arc or corner and put data about it into a temporary matrix. Data is then entered for the next matrix. When done entering the arcs or corners, the last arc or corner entered is connected to the first. The path from the previous segment to the temporary matrix just entered is calculated according to a subroutine (GOSUB H).

Under subroutine H what can be considered a smooth path from the arc previously entered to the arc just entered is calculated. This path, a line, is put into a matrix. When traveling from one circular arc to another there are many possible paths. This routine selects the path which is smoothest. If two circles intersect at a single point and one circle is totally contained within the other, the desired path will stay on the circumference of the circles. If the circles do not intersect in just one point, the smoothest path will not lie on the circles, but on a line connecting them. There are a maximum of four lines which satisfy the condition that the line must intersect each circle at one point, i.e., the line must be tangent to both circles. A line tangent to both circles has the same slope as the circle at the point of intersection. Thus, the slope only gradually changes, and more precisely, the equation of the second derivative is continuous everywhere on the figure.

To decide how many paths are possible for a particular configuration, one must analyze how close the circles are to each other, and how their relative size. There are six cases, and routine H decides which of the six cases applies.

Once the number and possible orientations for the paths is known, it is possible to select the precise path based on how the two arcs are rotating. This routine incorporates this choice. Subroutines I, J, K, and L are used to actually calculate the path geometry.

Subroutine M puts the calculated temporary matrix into the main matrix which stores data for the previous arcs that have been entered.

Subroutine N separates arcs that are concave to the right or to the left.

Subroutine O splits arc in half at (x, center).

Subroutine P finds the segments with minimum and maximum x values.

Subroutine Q proceeds through the figure and calculates the chord. The basic strategy is to start at the minimum x value for the configuration and keep track of the upper and lower segments as x is incremented repeatedly until a maximum x value is reached for the figure. For each increment of x, the y of the upper segment and the y value for the lower segment are found and subtracted to obtain the chord length.

Subroutine R calculates the y value of a segment given x.

Subroutine S totals and prints the chord lengths.

Subroutines relating to graphics and/or tables are then provided, if desired.

Determination is then made in suitable subroutines to determine if a new upper or lower segment is necessary. Calculation may then be made as to the horizontal path between ends of the chords (Subroutine T).

THE STRIP PUNCHING STATION

As indicated above, station D is the punching station for perforating the strip at predetermined intervals as determined by a computer using a program like that described above. A suitable structure for a punch is shown in greater detail in FIG. 2. The strip 10 is shown entering the punch press assembly 100 from the left. The press assembly 100 includes a rigid frame 102 having an upper plate 104, a lower plate 106 and side posts 108 and 110 threadedly engaged at their opposite ends in suitable tapped holes at the corners of the plates 104 and 106. There are four such posts, one at each corner, only two being shown in FIG. 2.

The punch assembly, generally indicated at 112, includes an air cylinder 114 mounted on the top plate 104. The cylinder 114 is provided with an outwardly extending piston rod 116 secured as by threading into a suitable bore (not shown) in a punch drive assembly generally indicated at 118. The punch drive assembly 118 includes an upper plate 120 and a lower plate 122 held in spaced relation by coil springs 124 and 126 surrounding telescoping guide posts 128 and 130.

The distal extremity of the piston rod 112 is threaded through a reinforcing boss 132 welded to plate 120. The piston rod 112 extends through an oversized bore 134 in upper fixed plate 104.

The upper movable plate 120 of the punch drive assembly 118 carries on its underside, mounting means 134 for securing a punch 136. In the embodiment shown in FIG. 2, the punch 136 is of a cylindrical shape and punches a hole, such as the hole 138, through the strip 10. A punch relief 140 is located on a strip supporting and locating block 142 suitably secured to the bottom plate 122 of the punch drive assembly 118. The bore 140 surmounts an opening 144 through both the plate 122 and the fixed plate 106 to allow escape of metal removed by the punching operation.

The strip 10 as it exits from the punch 100, passes through upper and lower indexing or encoding rolls 146 and 148, respectively, mounted for rotation in pressurized contact with either side of the strip 10. The indexing rolls 146 and 148 feed strip length data into the computer 150 which, as indicated above, controls the operation of the air cylinder and the distance between holes 138.

Instead of a single hole 138 located at predetermined intervals, the punch 136 may be replaced with a transversely extending punch bar having a plurality of strip perforating elements located thereon for perforating the strip 10 at a plurality of points across the strip 10 and along a line perpendicular to the marginal edges of the strip 10. These perforations may have an oval or "race track" shape. At a later point in the process, the strip will be folded along the transverse midline of the perforation or perforations. Where a plurality of perforations 138 of "race track" configuration are utilized, and the strip so folded, the perforations will form indentations in the catalyst element which can be utilized to coact with suitably located ridges in the housing of the finished catalytic converter to lock the catalyst member in place in the housing and prevent telescoping due to the pulsating effect of exhaust gases eminating from an internal combustion engine.

Any shape of canister from circular cross-section through oval, kidney shaped, rounded triangular, to rectangular, may be made by folding the strip 10 along transversely extending fold lines located by the perforations formed pursuant to a computer program such as outlined above. The above program enables new configurations to be designed rapidly and accurately and to be reproduced reliably on production equipment as otherwise described herein.

THE CORRUGATING STATION

The metal foil or strip 10 is corrugated by passing the foil between gears disposed on shafts, the gears being positioned to at least partially mesh together. In a preferred embodiment of the invention, the gears are designed so that the foil 10, which has a thickness of about 0.0022 inch, will not be stretched as it passes between the corrugating gears, and the corrugations are formed only by bending the foil out of the plane of the foil in opposite directions. It is important that the foil not be stretched; otherwise it may break and interrupt the manufacturing sequence. Torque delivered to drive the gears is also minimized when the foil is not stretched.

Reference may be had to the application of William B. Retallick entitled Rollers for Corrugating Metal Foil, Ser. No. 826,896 filed Feb. 6, 1986, for details of the design of the corrugating gears.

For convenience, however, reference may be had to FIGS. 3 and 4 of the drawings. FIG. 3 is a fragmentary cross-sectional view showing the foil strip 10 in cross-section between opposing corrugating gears. In FIG. 3, there are provided upper and lower gear supporting housing members 160 and 162. Housing members 160 and 162 are movable toward and away from each other to permit adjustment of the height of the corrugations, usually about 0.036 inch high. It is desirable to monitor continuously the height of the corrugations being formed and to adjust continuously the force applied to the upper housing 116 by a cylinder like 114 (FIG. 2) in a press like that shown also in FIG. 2.

The upper housing member 160 is provided with a gear receiving groove or slot 161 and axially aligned bores 164 and 166 adapted to rotatibly carry the respective ends of the drive shaft 168. The upper gear 170 is a unified gear structure formed of a plurality of gear segments (as will be discussed with respect to the driven gears mounted on lower driven shaft 172). The gear segments are relatively short (e.g. about 0.625 to 1.250 inches long) having an outer diameter of 0.5 inch with a central bore 0.25 inch to 0.375 inch in diameter, adapted to receive shaft 168. The individual gear segments making up the drive gear assembly 170 are welded or brazed to each other at their confronting ends and to the shaft 168 to form a unitary drive gear assembly. It will be noted that the gear teeth 174 of a single gear segment are angularly related to the gear teeth 178 of the next gear segment. The angular relationship defines an apex 180 which corresponds to the end of a single gear segment, the dividing line between such adjacent gear segments being obliterated by the brazing operation. It is the angular relationship of the teeth of the gear segments which creates the zig-zag nonnesting configuration of the corrugations.

The shaft 168 is driven by the projecting drive shaft 182 of a conventional commercially available variable speed drive motor (not shown).

The lower gear housing member 162 is fixed to the bottom shelf of a press, such as the bottom plate 106 of the press 102 in FIG. 2. The housing 162 is provided with a gear receiving slot 163 and axially aligned bores 184 and 186 to receive gear supporting shaft 172. The gear segments 188, 190, 192, 194, 196, and 198 are clearly shown. The confronting and contacting surface 200 between segments 188 and 190 is not soldered or brazed, gear segments 188 and 190 being individually drivingly rotated on shaft 172 by the drive gear assembly 170. The gear segments 188-198 are configured for meshing engagement with the corresponding gear segments mounted above on the driven shaft 168 with the foil in between. One or more pressure cylinders, such as cylinder 114 in FIG. 2, servo controlled by a sensor measuring the corrugation height, may be used in a press frame like that shown in FIG. 2 to effect adjustment of the extent of meshing of the gears and the resulting height of the corrugations. Two such cylinders 114 axially aligned with the shafts 168 and 172 and independently operable and located above the extremities of the shaft 169 have been found most satisfactory.

To minimize wear on the gears, a lubricant is required. It has been found that the most satisfactory lubricant is glycerine. The region between the drive gear and the driven gears is flooded with the glycerine, a certain amount remaining on the corrugated strip as it leaves the corrugating station E.

The configuration of the gears shown in FIG. 3 results in the formation of a chevron pattern in the corrugations. The gears are driven at a speed of from 200 to 1000 rpm as dictated by the speed of the strip 10.

THE LUBRICANT REMOVAL STATION

Figure 5:
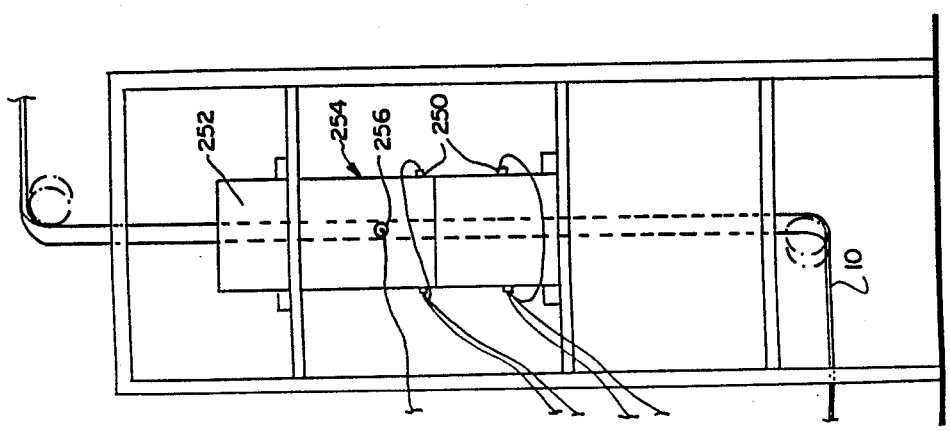
FIG. 5 is a diagrammatic and schematic view of an annealing tower for annealing the stainless steel strip.

As indicated above, the desired lubricant is glycerine. Glycerine is readily burned off in a vertical furnace such as shown in FIG. 5. The strip 10 is heated to a temperature of about 1200° F. by electric heating means, e.g. strip heaters 250 within a suitable insulation 252 wrapped tower 254. The strip 10 is passed upwardly through the middle of the tower 254. Temperature is monitored and controlled by suitable means from a sensor 256. The temperature control means are conventional and are not shown.

In this station F, the glycerine is fully decomposed to carbon dioxide and water which are environmentally acceptable, and the strip 10 is dry and prepared for application of a wash coat of alumina in the next station.

THE WASHCOATING STATION

At the washcoating station G (FIG. 1) a relatively heavy layer of refractory metal oxide, preferably aluminum oxide, is coated on the already formed aluminum oxide surfaces of the metal substrate 10. The washcoating station, generally indicated at 260 in FIG. 6, includes a spray booth 262 having top plate 264 and a bottom plate 266. The slots 268 and 270 are dimensioned to permit free passage of the strip 10 along a vertically extending path through the spray booth 260.

Suitably adjustably mounted within the spray booth 260 are spray guns 272, 274, 276 and 278, for spray application of a slurry of the refractory metal oxide, e.g., and aluminum oxide slurry in water. Although only 4 spray guns are shown in FIG. 6, a larger number of guns may be used. It is important that the coating is applied evenly to the exposed surfaces of the strip 10. FIG. 7 shows a pair of such guns diagrammatically indicated by dots 280 and 282. These are located so that the corrugations 284, 286 and 288 are coated evenly on both slopes 286-288 by gun 280 and 286-284 by gun 282. A similar arrangement is conveniently provided on the opposite side of the strip 10 but is not shown in FIG. 7.

As indicated, the coating composition is in the form of an aqueous slurry or slip which contains specific amounts of preferred catalyst carriers (alumina, for example), agents to improve the rheology of the system, and catalyst promoters. The various components of the slip or slurry may include, therefore, alpha alumina, gamma alumina, ceria, beryllia, zirconia, or gel alumina and titania, or hafnia, vanadium pentoxide or one or more metals from the lanthanum or rare earth metal groups, silica, magnesia, calcium aluminate, a zeolite or mixture of two or more thereof, all carried as a suspension in water at a concentration of from 20% to 60% solids in water. Suitable suspending agents may also be added to assist in minimizing wetting with or without mechanical agitation.

The zeolites can be any zeolite that can be adhered to the metal substrate when applied in accordance with the washcoat procedure described herein. These zeolites are preferably crystalline, hydrated, framework aluminosilicates which are based on a three-dimensional network of $AlO_4$ and $SiO_4$ tetrahedra linked to each other by sharing all of the oxygens. These zeolites may be represented by the empirical formula:

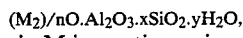
$(M_2)/nO.Al_2O_3.xSiO_2.yH_2O$, wherein M is a cation, x is generally equal to or greater than 2 since $AlO_4$ tetrahedra are joined only to $SiO_4$ tetrahedra, and n is the cation valence. The framework contains channels and interconnected voids which are occupied by the cation, M, and water molecules. The cations may be mobile and exchangeable to varying degrees by other cations. Ammonium and alkylammonium cations may be incorporated in the zeolites, e.g., $NH_4^+$, $CH_3NH_3^+$, $(CH_3)_2NH_2^+$, $(CH_3)_3NH^+$, and $(CH_3)_4N^+$. The structural formula of a zeolite can be expressed for the crystallographic unit cell as:

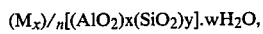
$(M_x)/n[(AlO_2)x(SiO_2)y].wH_2O$, wherein M is a cation of valence n, w is the number of water molecules and the ratio y/x usually has values of 1-100 depending upon the structure. The sum (x+y) is the total number of tetrahedra in the unit cell. The complex within the [] represents the framework composition. The zeolites described in the patent literature and published journals are usually designated by letter or other convenient symbols. Exemplary of these materials are Zeolite A (U.S. Pat. No. 2,882,243), Zeolite X (U.S. Pat. No. 2,882,244), Zeolite Y (U.S. Pat. No. 3,702,886), Zeolite ZSM-11 (U.S. Pat. No. 3,709,979), and Zeolite ZSM-12 (U.S. Pat. No. 3,832,449). These patents are incorporated herein by reference.

A typical washcoat formulation has the following composition:

| | |
|---|---|
| Calcined Alumina, mostly in gamma form | 70-80% |
| Gel Alumina | 15-20% |
| Ceria (Cerium Oxide) | 5-25% |

The gel alumina is usually a pseudo boehmite, $Al_2O_3.H_2O$, with considerable excess water beyond the single water of hydration.

A test of dispersibility of gel alumina is made by acidifying a 5% slurry of the gel alumina with nitric acid, to a maximum of 250 milli equivalents of $HNO_3$ per 100 gm of alumina, the active slurry is sheared in a blender for 20 minutes, and then centrifuged to remove particles longer than one micron. What is not collected in the centrifuge is the dispersible fraction of the alumina, and this can be as high as 98%. To make a washcoat slurry, the mixture of calcined alumina, gel alumina, and ceria is ball milled with sufficient nitric acid to give a final pH in the range of about 4–5. The purpose of the gel alumina is to make the washcoat hard and adherent after it has been calcined. The gamma alumina and the ceria have no cohesive properties of their own.

The thickness of the washcoat has a dry film thickness between about 5 and about 50 microns preferably between about 15 to about 40 microns depending upon the requirements of the particular application. The washcoat is most effective when it is of uniform thickness over the surface of the corrugated surface, such as achieved by the means shown in FIG. 7. The washcoated substrate is quite porous which permits it to sorb solutions of catalyst material quite readily.

After application of the washcoat, it is first dried in a heated column 60 (FIG. 1) at 250° F. to 350° F. and then calcined in a vertical tube furnace 62 (FIG. 1) at a temperature in the range of 850° F. to 950° F.

As indicated above, the coating is done with spray heads having 0.020 inch diameter orifices located to coat a herringbone pattern strip 7 inches wide. The required air delivery is from 5 to 20 standard cubic feet per minute (scfm) through each nozzle. Any suitable exhaust blower of conventional design (not shown) may be used to carry away overspray. Overspray in the embodiment shown in FIG. 6 is in the neighborhood of 40% and is therefore, worthy of recovery in the mass production line of the present invention.

There are a number of other methods for applying the alumina slurry onto the surface of the strip including electrostatic powder spray, electrophoretic, wet electrostatic airless (spinning bell), wet electrostatic air atomized spray and mechanical airless spray (spinning bell).

THE CATALYST STATIONS

As indicated the calcined washcoated surface is porous and absorbs the liquid phase noble metal catalyst compositions readily. The objectives of the catalyst stations H, I, and J are (1) to impregnate in and/or deposit the washcoat solutions of compounds to near to saturation or incipient wetness (i.e., the point where the spray applied liquid just starts to run down the vertically moving strip 10, (2) to eliminate waste of the metal compounds and (3) to record the deposition weight of the noble metals per unit length of the strip for ultimate calculation of the weight of noble metal catalyst in each catalytic converter unit. The catalytic metal that is impregnated and/or deposited on the washcoat is selected from palladium, platinum, nickel, copper, silver, prasseodymum, vanadium, etc., depends on the chemical conversion sought. For internal combustion engine exhaust conversion, the metals are palladium, platinum, and rhodium with or without cerium, and mixtures of two or more of said metals of the available catalytic metals the noble or precious metals are preferred.

The compounds of the catalyst metals listed above that are disolved in the solution that is applied to the washcoat can be any water or alcohol soluble compound including but not limited to the oxides, hydroxides, inorganic salts, (e.g. nitrates, phosphates, halides, carbonates, silicates, aluminates, etc.) and organic salts, (e.g. amine salts, organic carboxylic acid salts, such as acetates, formates, butyrates, benzylates, etc.) of said metals. Water soluble ammonium salts or hydroxides of these metals are particularly useful, for example:

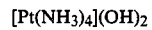

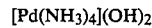

The ammonium hydroxide complexes can be applied from a single solution. For rhodium, the nitrate is cheaper than the ammonium hydroxide complex, but it must be applied from a separate solution because the acidic nitrate solution would react with the basic ammonium complex solution. In a fluidized bed application, these catalysts may be applied to the strip concurrently with the refractory metal oxide.

Figure 8:
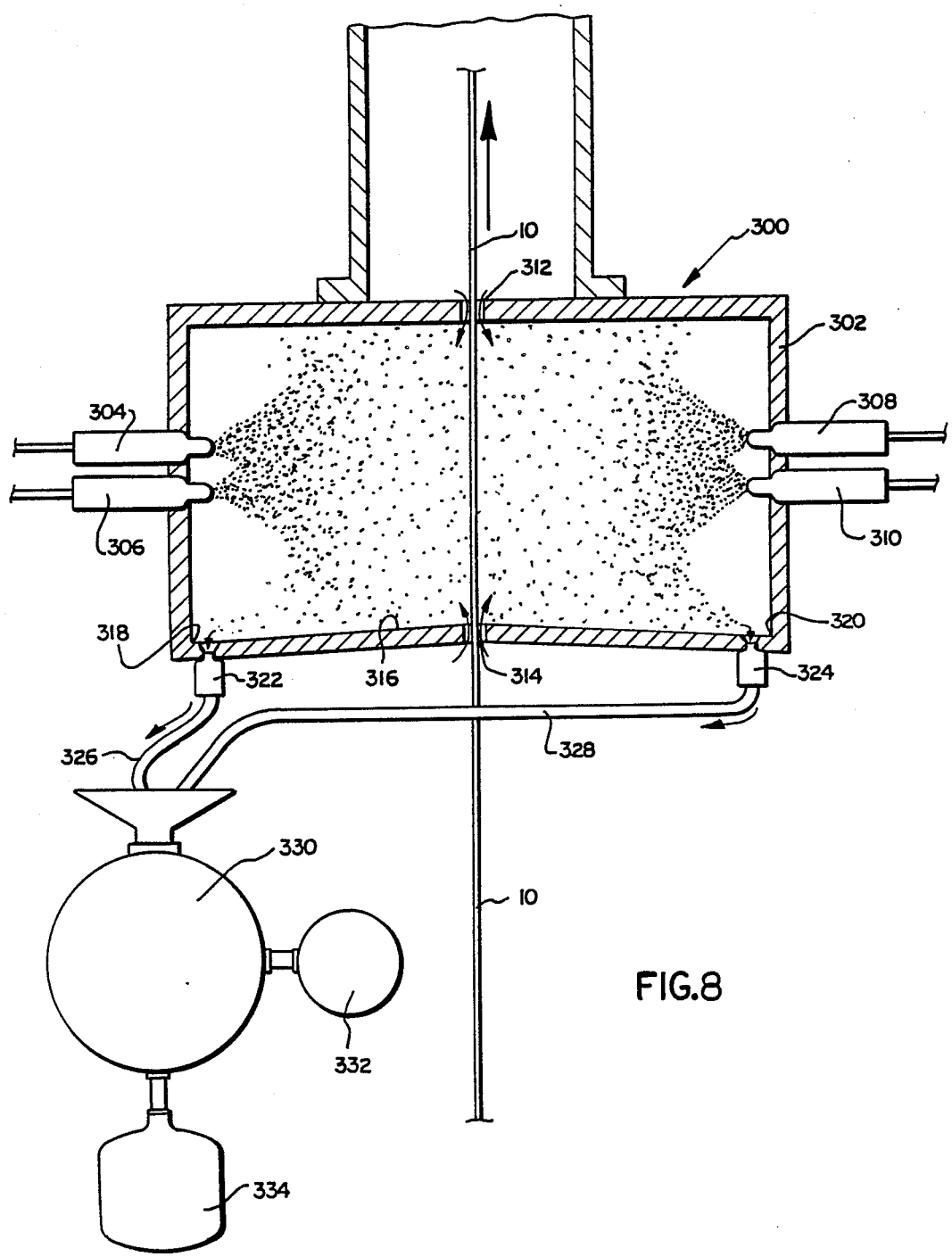
FIG. 8 is a diagrammatic and schematic cross-sectional view of an apparatus for the continuous application of precious metal catalyst to the washcoated and calcined stainless steel strip, and for recovery of excess precious metal solution.

Each of the catalyst application stations H, I, and J includes a chamber 300 such as shown in FIG. 8. The chamber 300 includes a closed box of chamber 302 having a plurality of ultrasonic spray heads, such as spray heads 304, 306, 308, and 310. Although only two spray heads, such as 304 and 306, and shown on one side of the corrugated strip 10, as many as 4 to 8 or more may be supplied for each side of the strip 10. These ultrasonic spray heads 304, 306, 308, and 310 discharge a mist of the noble metal compounds, e.g. platinum (station H), palladium (station I) and rhodium (station J). Desirably, these metals are present in aqueous solution in the form of water soluble salts at a concentration of from 0.5% to 5.0% by weight calculated as the metal. The chamber 302 is desirably transparent. It is provided with slots 312 and 314 for exit and entry, respectively, of the corrugated strip 10. Chamber 300 is maintained under reduced pressure, e.g. 0.01 to 1.0 inch of water.

The chamber 302 is also desirably provided with a downwardly outwardly sloped bottom surface 316 to aid in directing overspray and fogged solution to the outer lower edges 318 and 320 where the excess solution is collected and removed by vacuum through fittings 322 and 324. The fittings 322 and 324 are connected to conduits 326 and 328, respectively, and lead into a collection and condensing chamber 330 maintained under reduced pressure by vacuum pump 332. The condensate from condenser 330 is collected as a liquid in receiver 334 for recycle to the storage tanks (not shown) which are conventional and supply the ultrasonic spray guns, such as guns 304, 306, 308, and 310. The vacuum in the condensate recovery system is maintained at from 2 to 20 inches of water.

Catalyst applying stations H, I, and J are for convenience identical. After application of the catalyst solution in each station, the strip is dried in a tunnel furnace at a temperature in the range of 200° to 300° F., and then the strip is passed through a vertical furnace or heater where the temperature of the surface of the strip is elevated to from 850° F. to 950° F., whereby the noble metal is released as the zero valent metal uniformly deposited on the washcoated surface. The catalyst materials are deposited desirably singly and in sequence although plural application of catalyst metals from the same aqueous solution may be carried out albeit not as effectively. Moreover, the width of the catalyst application may desirably be less than the width of the metal strip leaving, for example one edge of the strip substantially catalyst free. Materials which tend to poison the noble metal catalysts tend to collect on the upstream or leading edges of the catalyst support core due to the high absorptive nature of the calcined refractory metal oxide coating thereon. This will prolong the effective life of the catalyst core by trapping catalyst poisons before they contaminate the balance of the core.

Station K is a station similar in construction and operation to the catalyst stations H, I, and J for applying a stabilizer, e.g. ceria also from as aqueous solution of a water soluble salt. Drying and calcining operations as above described are performed in this station.

THE COINING STATION

Station L (FIG. 1) is the coining station. FIGS. 9-12 show in greater detail the principal components of the station. The coining station L defines the length of the chords by making a hinge line or fold line at the beginning of each chord. The length of these chords and the reason for them has been described above.

Referring now more particularly to FIGS. 9-12, there are here shown components of the coining station. FIG. 9 shows in a partially cut away plan view apparatus for creasing the strip 10 at predetermined intervals. Creasing or coining is effected by passing the strip 10 through the nip 400 between rolls 402 and 404 shown in end view in FIG. 12. There is provided a suitable press frame generally indicated at 406 and including a fixed bottom plate 408 of rectangular configuration, and side posts (four in number) one at each corner, e.g. posts 410 and 412, and a top plate 414 suitably secured to the posts at the corners. Mounted on the top plate 414 is an air cylinder, or solenoid operated drive 416, an inner movable plate 418 is provided for movement in a vertical direction along the corner posts, e.g. posts 410 and 412. The drive 416 is intermittently operated by the computer 420 in response to signals received from an electric beam source 422 and a sensor 424 coacting therewith. When a perforation 423 (or 138 in FIG. 2) permits a beam 425 to pass through the strip 10, the computer 420, or other suitable indexing device 420, is triggered in response to the signal received from the sensor 424.

The drive 416 is provided with a plunger 426 threadedly engaged through a tapped hole 428 in the center of movable plate 418. Movement of the plate 418 through a short stroke effects the coining operation as explained below.

As indicated above, coining is accomplished by passing the strip 10 between a pair of coining rolls 402 and 404. The upper roll 402 is supported for rotation about its axle 430 by brackets 432 and 434 at opposite end of the axle 430. Brackets 432 and 434 are secured to movable plate 418 by any suitable means, e.g., threaded fasteners or by welding, and move upwardly and downwardly with the movable plate 418. Roll 402 and 404 are supported in pillow blocks 436 and 438. Roll 404 is fixed in the pillow blocks 436 and 438 against vertical displacement albeit journalled for rotation about its axle 437 in suitable bearings (not shown).

The upper roll 402 is movable in the pillow blocks 436 and 438. The shaft 430 passes through movable bearings 440 and 442 which are mounted for vertical displacement in slots 444 and 446, respectively, (see FIG. 11). Thus, upper roll 402 is movable vertically relative to roll 404.

As shown in FIGS. 9 and 10, the rolls 402 and 404 are driven by a stepping motor 448 stationarily mounted in the frame 406 and set for 180 degrees of rotation. Motor 448 is fitted with a sprocket 450 mounted on the drive shaft 452. Suitable sprockets 454 and 456 are mounted on the shafts 437 and 430 of rolls 404 and 402, respectively. A chain 458 is reeved relative to sprockets 450, 454 and 456 and shown in FIG. 10 so that both rolls 404 and 402 rotate through 180 degrees in the same direction in response to the 180 degree steps of the stepping motor 448.

As best shown in FIG. 12, the rolls 402 and 404 are each provided with a projecting knife edge, e.g., knife edges 458 and 460, respectively. Diametrically opposite the knife edges 458 and 460, there is embedded in the surface of each roll 402 and 404, a resilient pad or anvil e.g. pads 462 and 464. Pads 462 and 464 are desirable formed of polyurethane having a resilience of from 50 to 60 durometer. The pads 462 and 464 are desirably about 0.0625" thick and recessed an equivalent amount in suitable recesses 468 and 470 milled into the surfaces of the rolls 402 and 404, respectively, and coextensive in length with the knife edges 458 and 460. Pads 462 and 464 are conveniently ⅛ inch to 3/16 inch thick and about ½ inch to 1 inch wide.

As best shown in FIG. 12, when the air cylinder 416 is actuated pursuant to a signal received from the computer 420, the upper roll 402 with its knife edge 458 in confronting relation to the strip 10, is sharply driven downwardly against the surface of the strip 10 and, because of the resilience of the pad 464 in lower fixed roll 404, penetrates in the pad 464 a distance sufficient to exceed the elastic limit of the metal strip 10 and cause a crease to be formed in the strip 10. Coining is done with at most only momentary stopping of the movement of the metal strip 10. When this operation is terminated, the stepping motor 448 quickly rotates both rolls 402 and 404 through 180 degrees. On the succeeding signal directing the rolls 402 and 404 toward each other, the knife edge 460 on the lower roll 404 will contact the bottom of the strip 10 and move a short distance into the resilient pad 462 above the strip causing an oppositely directed crease to be formed in the strip 10.

The strip 10 with the zig-zag configuration is now identified by the number 12 (FIG. 1).

Instead of the anvils and knives being located 180° apart, other angular displacements thereof may be used, e.g. alternating knives and anvils being related by 90° instead of 180°.

THE CUT OFF STATION

The cut-off station M is arranged to coact with the computer 34 (FIG. 1) to operate a low inertia knife and slot cutter at a point determined by the computer.

The length of the strip segment will be that which when fan-folded along each of the creases formed in station L will provide a catalytic core member having the proper geometric configuration in cross-section.

THE FOLDING STATION

The operation of fan-folding the strip segment may be done by hand. Alternatively, the strip segment can be fed to the top of a vacuum chute (Station N. in FIG. 1) at the bottom which is a sliding drawer 76 that alternatively moves in a direction that accommodates the folds and which is driven by the operator. Once introduced into the chamber, the strip segment will be pulled by the vacuum downwardly, one fold at a time until the entire core is formed and contained in the drawer 76.

THE FINAL ASSEMBLY

Station O is where the now compacted core is inserted into a suitable shell, such as that described in Cornelison's copending application Ser. No. 760,498 filed July 30, 1985. The end caps for the housing are then secured at Station P and Q by welding. The structure is inspected at station R and packaged at Station S. The core may also be made quite long, e.g. 10 to 30 inches, and folded or spirally wound for (1) insertion in an exhaust pipe 1.5 to 6 inches in diameter and provided with suitable detents to prevent axial movement of the core, or (2) to serve in a dual capacity as a catalytic converter and muffler.

In the final product, the density of the catalytic metal or metals is generally in the range of from 5 to 100 grams per cubic foot of the fan-folded catalyst support structure, and preferably from about 10 to 50 grams/ft.$^3$. These media generally contain from 30 to 600 cells/sq. inch.

There has thus been provided a continuous process and process line for the fabrication of a continuous web of ferritic stainless steel to make metal substrate catalyst cores and catalytic converters utilizing such cores. Other modes of carrying out the principles of the present invention may be employed, change being made as regards the details of construction, the mode of operation and the order in which the steps are performed without departing from the spirit of this invention as set forth in the following claims.

What is claimed is:

1. A process for making a metal catalyst support core for a catalytic converter from a continuous metal strip, comprising the steps of:
    (a) corrugating the metal strips,
    (b) depositing at least one catalyst material on the corrugated metal strip,
    (c) impressing fold lines on alternate sides of the strip along the entire length thereof, the fold lines extending transversely of the strip, and
    (d) folding and gathering the strip along the fold lines impressed in step (c) to form a fan-folded metal catalyst support core.

2. The process of claim 1, further comprising the step of perforating the metal strip at predetermined intervals such that the strip when folded along a line extending through the perforations, will have a desired cross-sectional shape.

3. A process as defined in claim 2 wherein said strip is perforated at predetermined uniform intervals.

4. A process as defined in claim 2 wherein said strip is perforated at chordal intervals for folding to fit a circular shell.

5. The process of claim 1, wherein a coating step is performed after the corrugating step, and wherein the coating step comprises the steps of applying a coating which can be impregnated with a catalyst, and impregnating the coating with catalyst.

6. The process of claim 5, further comprising the step of regulating the amount of catalyst deposited per unit area of the strip.

7. The process of claim 1, wherein the metal strip is severed immediately before or after the folding step to provide a section of the strip, and wherein the severed section, when folded in a zig-zag manner, forms the desired shape catalyst support.

8. The process of claim 1, wherein the corrugating step is preceded by the step of annealing the strip.

9. A process for making a metallic catalyst support or core in a continuous manner which comprises the steps of:
    (a) Corrugating a thin ferritic metal strip,
    (b) Perforating said ferritic metal strip at predetermined intervals,
    (c) Applying a coating to at least one surface of said strip which coating is adapted to be impregnated with at least one precious metal catalyst,
    (d) Applying a precious metal catalyst to said refractory metal oxide surface,
    (e) Coining said ferritic metal strip to form alternating fold lines transversely of said strip, said fold lines being located at the perforations formed in said ferritic metal strip and on opposite sides of said strip and,
    (f) Gathering said coined strip to form a fan-folded catalyst body.

10. A process as defined in claim 9, wherein step (c) is applying a coating of refractory metal oxide to the surface of said strip and calcining said strip at a temperature above about 800° F. for a period of time sufficient to adhere said refractory metal oxide to the ferritic metal strip.

11. A process as defined in claim 10 wherein the ferritic metal strip is calorized.

12. A process as defined in claim 11 wherein the ferritic metal strip is annealed prior to corrugating.

13. A process as defined in claim 12, wherein the strip is annealed at a temperature of from about 1400° F. to about 1700° F.

14. A process as defined in claim 9 wherein the coating includes a refractory metal oxide.

15. A process as defined in claim 10 wherein the refractory metal oxide is aluminum oxide.

16. A process as defined in claim 9 wherein said coating of refractory metal oxide is spray applied as an aqueous slurry.

17. A process as defined in claim 9 wherein said refractory metal oxide coating is applied by electrostatic means by passing the corrugated strip through a fluidized bed of suspended particles comprised of any one or a combination of alumina, ceria, titania, silica, calcium aluminate, or other refractory metal oxide.

18. A process as defined in claim 17 wherein the suspended alumina particles are generated from an aqueous slurry and frozen prior to entry into an electrostatic field.

19. A process as defined in claim 9 wherein the coating is formed from a mixture of refractory metal oxides.

20. A process as defined in claim 19 in which the mixture is formed of alumina and ceria in a ratio of 9:1 to 3:1.

21. A process as defined in claim 9 in which the precious metal catalyst is applied from an aqueous solution.

22. A process as defined in claim 21 in which the precious metal catalyst is spray applied.

23. A process as defined in claim 9 in which the precious metal catalyst is mixed with the metal oxides of claim 9 and applied electrostatically in a fluidized bed.

24. A process as defined in claim 9 in which a plurality of precious metal catalysts are applied to the coated surface in sequence or mixed.

25. A process as defined in claim 9 in which the metal catalyst comprises palladium.

26. A process as defined in claim 9 in which the metal catalyst comprises platinum.

27. A process as defined in claim 9 in which the metal catalyst comprises rhodium.

28. A process as defined in claim 9 in which the metal catalyst consists essentially of platinum, palladium and rhodium.

29. A process as defined in claim 9 wherein the strip is coined for fan folding by passing between a pair of rolls each having an axially extending anvil surface and an axially extending fold line forming edge, said anvil surface and said edge being angularly related, rotating said rolls to alternately present an anvil surface and an edge to said strip, and causing said rolls to contact said strip with sufficient force to indent the metal strip on alternate sides of the strip at predetermined intervals.

30. A process as defined in claim 29 wherein the anvil and the edge on each roll are 180° apart and said for each predetermined interval said rolls are rotated 180°.

31. A process as defined in claim 29 wherein the anvil surface is resilient.

32. A process as defined in claim 31 wherein the anvil surface is a polyurethane pad extending longitudinally of said roll.

33. A process as defined in claim 9 wherein the predetermined intervals are determined by computer software.

34. A process as defined in claim 9 in which the coating is formed of:

| | |
|---|---|
| Calcined alumina (gamma) | 70-80% |
| Gel alumina | 15-20% |
| Cerium Oxide | 5-25% |

35. A process as defined in claim 9 in which the precious metal catalyst is mixed with the metal oxides of claim 9 and is applied by dipping.

36. A process as defined in claim 9 wherein the coating contains zirconia.

37. A process for making a metallic catalyst support or core in a continuous manner which comprises the steps of:
  a. corrugating a thin ferritic metal strip,
  b. applying a thin coating of refractory metal oxide to at least one surface of said strip which coating is adapted to be impregnated with at least one precious metal catalyst,
  c. applying at least one precious metal catalyst to said refractory metal oxide surface,
  d. coining said ferritic metal strip to form alternating fold lines transversely of said strip at predetermined intervals on opposite sides along the entire length of said strip,
  e. severing a predetermined length of said coined thin metal strip, and
  f. gathering said severed length of coined thin metal strip to form a fan-folded catalyst body.

* * * * *